UNITED STATES PATENT OFFICE.

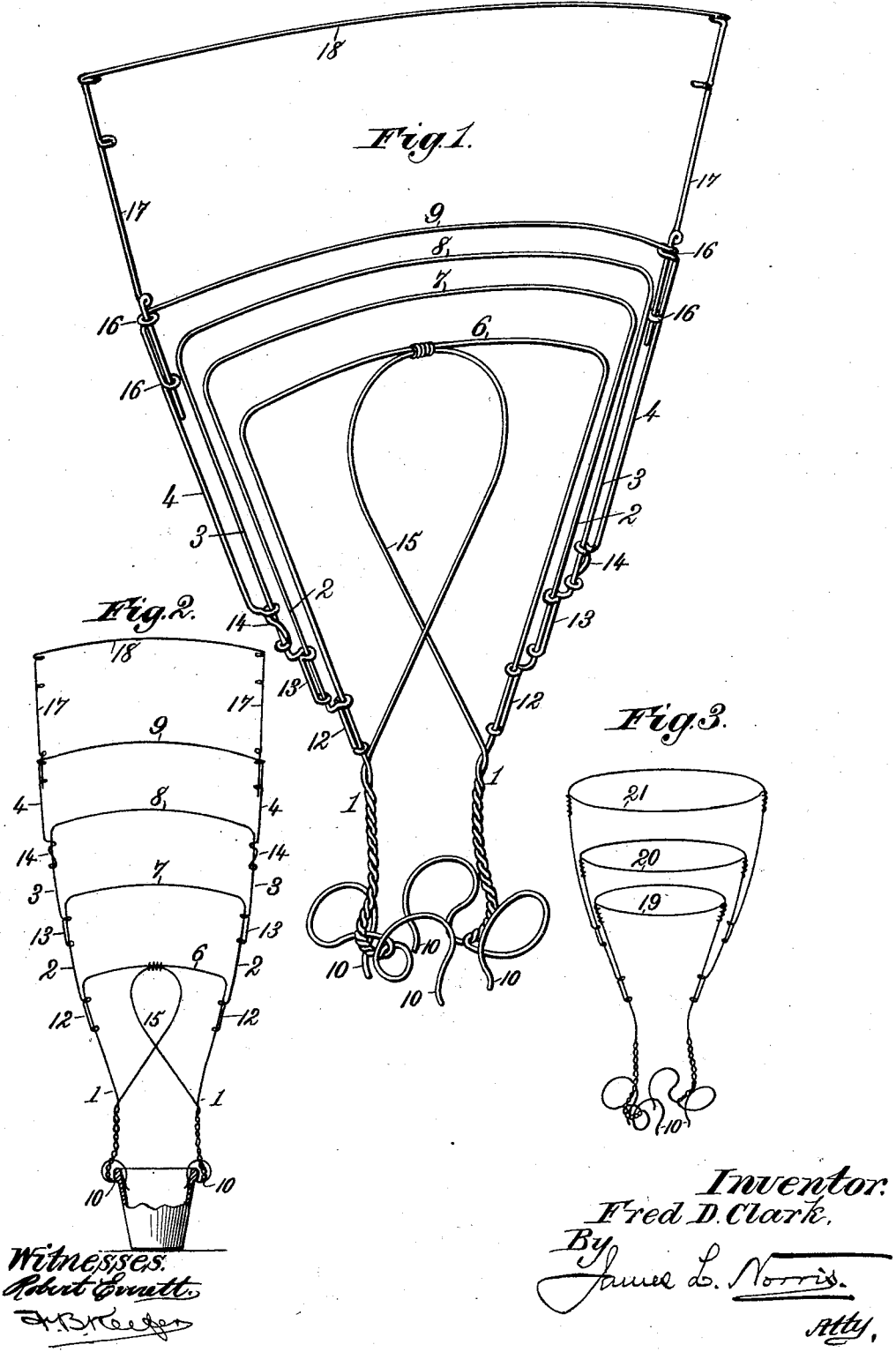

FRED D. CLARK, OF PRATTSBURG, NEW YORK.

TRELLIS.

SPECIFICATION forming part of Letters Patent No. 605,778, dated June 14, 1898.

Application filed May 22, 1897. Serial No. 637,782. (No model.)

*To all whom it may concern:*

Be it known that I, FRED D. CLARK, a citizen of the United States, residing at Prattsburg, in the county of Steuben and State of New York, have invented new and useful Improvements in Trellises, of which the following is a specification.

This invention relates to that type of trellis designed to be attached to a flower-pot or other receptacle containing a growing plant or vine for the purpose of supporting or training the plant or vine as it grows or increases in height, the trellis being mounted on the pot or receptacle through the medium of spring clamps or clutches forming a part of the base of the trellis, as described and shown in Letters Patent No. 581,896, issued May 4, 1897, to myself and G. W. Warren.

The chief object of my present invention is to improve the trellis referred to by rendering it susceptible of being extended or retracted, so that its height may be increased or diminished to suit the conditions required, according to the height of the plant or vine, in such manner that as the plant or vine grows or increases in height the trellis may be conveniently and quickly extended vertically to any required extent. To accomplish this object, my invention consists, essentially, in a trellis composed of a plurality of frames constructed to support a flower or vine and slidable vertically in operative connection with one another for the purpose of increasing or diminishing the height of the trellis to suit the conditions required, according to the height of the plant or vine or as may be requisite to support the plant or vine as it grows, the lowermost frame having opposite arms provided with clutches to engage a flower-pot.

The invention also consists in the features of construction and in the combination or arrangement of parts hereinafter described and claimed, reference being made to the accompanying drawings, in which—

Figure 1 is a perspective view of my improved trellis in its retracted condition. Fig. 2 is a side elevation showing the trellis extended, and Fig. 3 is a detail perspective view showing a modified construction of the trellis.

In order to enable those skilled in the art to make and use my invention, I will now describe the same in detail, referring to the drawings, wherein the numerals 1, 2, 3, and 4 indicate the arms or legs of a plurality of wire frames which comprise transverse arches or members 6, 7, 8, and 9 for the purpose of providing a plurality of frames which are arranged in operative connection, as hereinafter explained, to obtain a trellis particularly designed for supporting or training plants or vines while they are growing.

The arms or members 1 of the lower or base frame are provided with spring clamps or clutches 10, constructed to clasp the edge of a flower-pot or other receptacle containing a growing plant or vine. The clamps or clutches grip the inner and outer edges of the pot or receptacle and serve to maintain the trellis as a whole in a perpendicular position, or approximately so. The trellis may, however, be supported in an upright position by any suitable means; but I prefer to employ the clutches or clamps and to construct them substantially the same as the clutches or clamps described and claimed in the patent before mentioned, whereby the trellis can be quickly connected with and disconnected from the pot or other receptacle.

The individual frames above mentioned are each formed from a single piece of wire; but they may be made of bars or rods of metal or of any material suitable for the purpose. They can be very economically manufactured from wire, which is the best material to employ in the construction of the entire device.

Assuming the trellis to be upright, the several frames above the base or lower frame are slidable perpendicularly one upon the other for the purpose of increasing or diminishing the height of the trellis to suit the conditions required, according to the height of the plant or vine or as occasion may demand as the plant or vine grows. The vertically-slidable frames are arranged in operative connection with each other and with the base or lower frame by providing the arms or members of such frames with guides 12, which embrace and are susceptible of sliding upon the arms or members of another frame. Any desired number of individual frames may be employed, according to the size or capacity of the trellis desired.

The guides 12 engage and slide upon the arms or members 1 of the base or lower frame, while the guides 13 engage and slide upon the arms 2, and the guides 14 engage and slide upon the arms 3.

The guides may be constructed in any suitable manner, but are preferably formed by bending the extremities of the wires composing the frames into pairs of eyes. By providing each extremity of the arms of the sliding frames with two separated eyes the latter serve to sustain the frame in an upright position, the construction being such that, if desired, all of the frames may lie in approximately the same vertical plane.

The base or lower frame may comprise a suitably-shaped brace-frame 15, similar to the brace-frame in the patent referred to; but this base-frame is not indispensable.

The top portion of the arms 4 of the uppermost frame is constructed in the present instance with eyes or holders 16 to receive and hold the arms or members 17 of a removable and replaceable extension-frame 18. This extension-frame can be readily removed when it is not desired for use, and when replaced it produces a lengthening of the trellis, which under some circumstances is very desirable.

The arms of each frame converge downwardly from its transverse arch or member for the purpose of securing a trellis which is comparatively wide at its upper portion and comparatively narrow at its base portion. The guides of each frame engage another frame with a sufficiently tight fit to secure the frames in position when extended the desired distance.

In the modified construction, Fig. 3, I employ circular or ring-shaped wires 19, 20, and 21 instead of the arches or members 6, 7, and 8 illustrated in Figs. 1 and 2. Inasmuch as the construction illustrated in Fig. 3 is identically the same as the construction illustrated in Figs. 1 and 2, except as to the substitution of the circular or ring-shaped wires 19, 20, and 21 for the arches or members 6, 7, and 8, I do not deem it necessary to describe in detail all the parts shown in Fig. 3. With the trellis constructed as shown in Fig. 3 the plant or flower may rise through the circular or ring-shaped wires and be supported thereby, or a vine may be trained around the entire trellis.

My invention provides a novel, simple, efficient, and economical trellis which can be conveniently and quickly connected with and disconnected from a flower-pot or other receptacle and can also be lengthened or shortened to increase or diminish its height as circumstances may require or conditions render desirable.

I prefer to employ clamps or clutches 10, formed as herein shown and as fully explained in the prior patent referred to, in that they are provided with contact-points which engage under the peripheral bead or rib of a flower-pot, as in Fig. 2, so that the trellis may be used as a handle for lifting the pot from place to place.

Having thus described my invention, what I claim is—

1. A trellis, consisting of a plurality of frames constructed to support a plant or vine and slidable vertically in operative connection with one another, for the purpose of lengthening, or shortening the trellis to increase or diminish its height, the lowermost frame having opposite arms provided at their lower ends with clutches to engage a flower-pot, substantially as and for the purposes described.

2. A trellis, consisting of a plurality of frames constructed to support a plant or vine and slidable vertically in operative connection with one another for increasing or diminishing the height of the trellis, the base or lower frame having opposite arms formed integral at their lower ends with spring-clutches for engaging a flower-pot or receptacle by which the trellis is supported upright, substantially as and for the purposes described.

3. A trellis, consisting of a plurality of wire frames, each having arms or members, the arms or members of the base or lower frame having spring-clutches to engage opposite sides of a flower-pot or receptacle and the arms or members of the other frames having sliding engagement with one another, for increasing or diminishing the height of the trellis, substantially as and for the purposes described.

4. A trellis, consisting of a plurality of wire frames each composed of side arms or members connected at the top by a transverse member, the arms or members of the base or lower frame having spring-clutches to engage opposite sides of a flower-pot or receptacle and the arms or members of the remaining frames having sliding engagement with one another, substantially as and for the purposes described.

5. A trellis, consisting of a plurality of wire frames, each composed of converging side arms or members and a transverse member, the base or lower frame having spring-clutches by which it may be supported upright and the remaining frames having their side arms or members provided with guide-eyes, so that said eyes of one frame may slide vertically upon the arms of another frame for increasing or diminishing the height of the trellis, substantially as and for the purposes described.

6. A trellis, consisting of a plurality of frames slidable longitudinally one upon another for increasing or diminishing the height of the trellis, and an extension-frame movably connected with the top portion of the uppermost slidable frame, substantially as and for the purposes described.

7. A trellis, consisting of a plurality of frames slidable longitudinally with relation to one another for increasing or diminishing the height of the trellis, the base or lower frame having clutches constructed to engage the bead or rib on the mouth of a flowerpot, substantially as and for the purposes described.

8. A trellis, consisting of a wire base or lower frame, and a plurality of upper frames, each composed of two arms connected by a transverse member, and the arms of each frame bent into eyes which engage and slide longitudinally on the arms of another frame, all of the frames being composed of wire, and the slidable frames mounted on the base or lower frame, substantially as and for the purposes described.

9. A trellis, consisting of a plurality of wire frames, each composed of two converging arms connected at the top by a transverse member, the arms of one frame having eyes sliding longitudinally on the arms of another frame for increasing or diminishing the height of the trellis, substantially as and for the purposes described.

In testimony whereof I have hereunto set my hand in presence of two subscribing witnesses.

FRED D. CLARK.

Witnesses:
EZRA KINKAID,
J. G. ARNOLD.